United States Patent
Dahan et al.

(10) Patent No.: US 9,734,828 B2
(45) Date of Patent: Aug. 15, 2017

(54) METHOD AND APPARATUS FOR DETECTING USER ID CHANGES

(71) Applicant: Nuance Communications, Inc., Burlington, MA (US)

(72) Inventors: Jean-Guy E. Dahan, Cote St. Luc (CA); William F. Ganong, III, Brookline, MA (US); Jianxiong Wu, Acton, MA (US)

(73) Assignee: Nuance Communications, Inc., Burlington, MA (US)

( * ) Notice: Subject to any disclaimer, the term of this patent is extended or adjusted under 35 U.S.C. 154(b) by 248 days.

(21) Appl. No.: 13/712,630

(22) Filed: Dec. 12, 2012

(65) Prior Publication Data

US 2014/0164597 A1    Jun. 12, 2014

(51) Int. Cl.
*G06F 15/16* (2006.01)
*G10L 15/22* (2006.01)
*G10L 17/00* (2013.01)

(52) U.S. Cl.
CPC .............. *G10L 15/22* (2013.01); *G10L 17/00* (2013.01); *G10L 2015/227* (2013.01)

(58) Field of Classification Search
CPC ..................................................... G10L 15/22
USPC ........................................................ 709/224
See application file for complete search history.

(56) References Cited

U.S. PATENT DOCUMENTS

| | | | | |
|---|---|---|---|---|
| 8,600,746 B1* | 12/2013 | Lei et al. | ...................... | 704/235 |
| 2008/0082332 A1* | 4/2008 | Mallett | ................... | G10L 15/07 704/250 |
| 2010/0199098 A1* | 8/2010 | King | ................... | G06F 21/6254 713/182 |
| 2011/0313776 A1* | 12/2011 | Alfred et al. | ................. | 704/275 |
| 2012/0188087 A1* | 7/2012 | Wang | ............................ | 340/657 |
| 2012/0290301 A1* | 11/2012 | Bahl | ................... | H04M 3/4936 704/235 |
| 2013/0073607 A1* | 3/2013 | Smirnov | ................ | G06Q 10/00 709/203 |

(Continued)

OTHER PUBLICATIONS

Near-duplicates and Shingling [online], 2008 [retrieved on Dec. 12, 2012]. Retrieved from the Internet URL: http://nlp.stanford.edu/IRbook/ html/htmledition/near-duplicates-and-shingling-1.html.

*Primary Examiner* — Hamza Algibhah
(74) *Attorney, Agent, or Firm* — Hamilton, Brook, Smith & Reynolds, P.C.

(57) ABSTRACT

In many speech-enabled applications, adaptation of speech recognition and language understanding tools for different users are employed. With such adaptation, identifying the particular user precedes applying the speech recognition and language understanding tools. According to at least one example embodiment, a method and corresponding apparatus of identifying a user includes comparing personal information data received from a user network device against personal information accessible by the server; and identifying a speech profile specific to the user based on the results of comparing the personal information data retrieved from the first user network device against the personal information accessible by the server. The identified speech profile is used in processing a speech of the user. Through use of the method or corresponding apparatus, a user can proceed directly to the use of the speech recognition or other applications and bypassing a login sequence.

16 Claims, 4 Drawing Sheets

(56) References Cited

U.S. PATENT DOCUMENTS

| | | | |
|---|---|---|---|
| 2013/0073865 A1* | 3/2013 | Kornafeld | H04L 9/3231 |
| | | | 713/189 |
| 2013/0102283 A1* | 4/2013 | Lau | H04W 12/06 |
| | | | 455/411 |
| 2013/0110511 A1* | 5/2013 | Spiegel | G10L 15/22 |
| | | | 704/243 |
| 2013/0189652 A1* | 7/2013 | Marttila | G09B 19/04 |
| | | | 434/156 |
| 2014/0088961 A1* | 3/2014 | Woodward | G10L 15/22 |
| | | | 704/235 |

* cited by examiner ated into a user-specific acoustic profile and user-specific linguistic features may be collected into a user-specific linguistic profile. Alternatively, both user specific acoustic features and user-specific linguistic features are grouped into a user-specific speech profile.

METHOD AND APPARATUS FOR DETECTING USER ID CHANGES

BACKGROUND OF THE INVENTION

Speech-enabled applications are becoming commonly used across different services. Whether in customer service call centers, TV guide services, or mobile applications, consumers are frequently interacting with employed speech-enabled applications. The use of speech-enabled applications across different areas is motivated by an associated competitive advantage, efficiency enhancement, and cost reduction. The accuracy of such applications is improved when information about the user making the request, stored in a user profile, are brought to bear in the speech recognition process.

SUMMARY OF THE INVENTION

According to an example embodiment, a method and corresponding apparatus of identifying a user includes comparing personal information data received from a user network device against personal information accessible by a server; and identifying a speech profile specific to the user based on the results of comparing the personal information data retrieved from the first user network device against the personal information accessible by the server. The identified speech profile is used in processing speech of the user.

The received personal information data includes one or more lists of contacts, information associated with one or more applications, voice recording data, information associated with one or more music files, information associated with one or more multimedia files, location information data, or the like. The information associated with music or multimedia files includes, for example, a list of names or identifiers of the files, metadata associated with the files, information or data elements extracted from the files, or the like. The information associated with the one or more applications include, for example, application name(s) or identifier(s), application metadata, information related to events/actions associated with the application(s), such downloading, uploading, or access information, or the like. The user network device may be a communication device such as an in-car communication system, television set, home appliance device, or communication device, e.g., a wireless device, tablet computer, personal computer, laptop computer, or the like.

According to another example embodiment, the speech profile is associated with a device identifier (ID). Denoting the user network device from which the personal information data is received as a first user network device, the device ID corresponds to a second user network device. When the user uses the first user network device, the server links the device ID of the first user network device to the user-specific speech profile based on the comparison of the personal information data received from the first user network device to the personal information accessible to the server. The sever may also map the device ID of the first user network device by the user-specific speech profile.

According to yet another example embodiment, comparing the personal information data received from the user network device against the personal information accessible by the server may include comparing a list of personal information data received from the first user network device against a list of personal information accessible by the server using a shingling method; or comparing one or more items of the personal information data received from the first user network device against one or more items of the personal information accessible by the server using hash keys. In the case where the personal information data includes recorded voice data, the comparison includes comparing features extracted from the recorded voice data received from the user network device to features accessible by the server. The extraction of the features, or parameters, may be performed by the server.

Another example embodiment may include a non-transitory computer-readable medium with computer code instructions stored thereon, the computer code instructions, when loaded and executed by a processor, cause an apparatus to perform the following: comparing personal information data received from a user network device against personal information accessible by the server; and identifying a speech profile specific to the user based on the results of comparing the personal information data retrieved from the first user network device against the personal information accessible by the server.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Speech-enabled applications usually make use of speech recognition and natural language understanding tools to analyze and understand spoken language. In many speech-enabled applications, adaptation of such tools to a particular user is employed. The adaptation enhances the accuracy and reliability of the speech-enabled applications by making use of user-specific acoustic and linguistic features. User-specific acoustic features are typically features acquired based on models of the human auditory system, modeling the characteristics of the user's voice and user's pronunciation. Examples of acoustic features include the Mel Frequency Cepstrum Coefficients (MFCC) feature, the Perceptual Linear Predictive (PLP) feature, and the Mel Frequency-Perceptual Linear Predictive (MF-PLP), and other features known in the art. Examples of user-specific linguistic features include expressions and terms usually used by the particular user. User-specific acoustic features may be collected into a user-specific acoustic profile and user-specific linguistic features may be collected into a user-specific linguistic profile. Alternatively, both user specific acoustic features and user-specific linguistic features are grouped into a user-specific speech profile.

Figure 1:
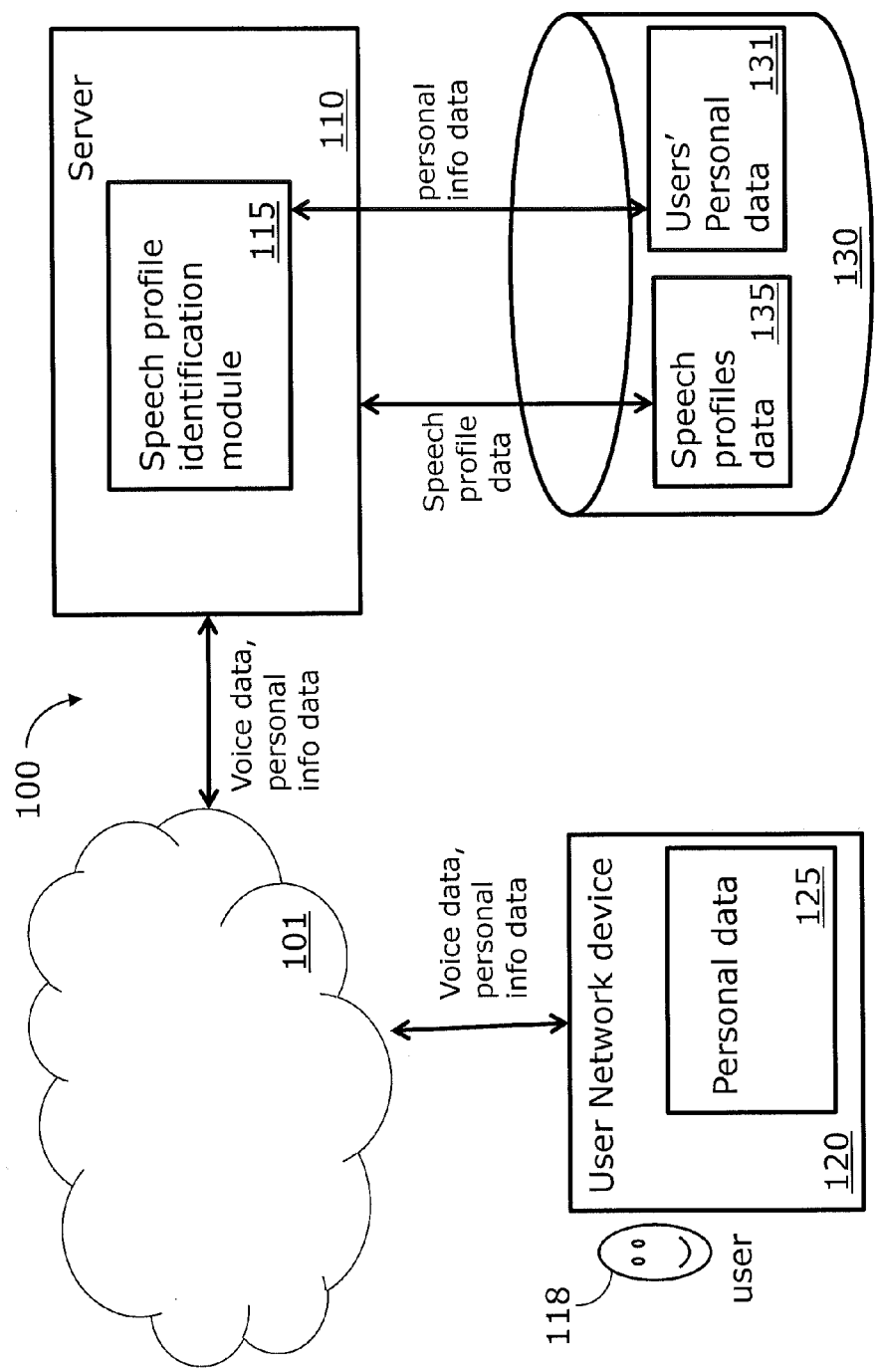
FIG. 1 is an example environment in which example embodiments are implemented.

FIG. 1 is an example environment 100 in which example embodiments are implemented. The environment 100 includes a communications network 101 communicatively coupling a user network device 120 to a server 110. The server 110 provides at least one speech-enabled service to user network devices such as the user network device 120. The user network device 120 makes a request for speech recognition and language understanding to the server 110 through the communications network 101. The request may be in the form of a call initiated between the user 118 of the user network device 120 and an automatic agent associated with the server 110. Alternatively, the request may include a user-recorded speech sent to the server 110 for processing. A person skilled in the art should appreciate that the request may be made according to other forms.

The server 110 has access to stored speech profiles data 135 including acoustic or linguistic features specific to each of a plurality of users. For example, the speech profiles data 135 may be stored in the database 130. The database 130 may be implemented in the computer server 110. Alternatively, the database 130 may be implemented independent of, but accessible by, the server 110. According to an example embodiment, the server includes a Speech Profile Identification (SPI) module 115 configured to identify the user 118 making the request, upon receiving a request. Identifying the user 118 includes identifying a corresponding user-specific speech profile with acoustic or linguistic features to be employed in processing a speech of the user 118.

User identification may be achieved through a registration process each time the user interacts with the speech-enabled service provided by the server 110. In the registration process, the user provides, for example, a login and password. Registration processes are usually perceived by users as tedious. According to at least one example embodiment, the user is identified automatically upon making a request to the server for speech recognition or language understanding. For example, a user or device identifier (ID) assigned to the user 118 is provided to the server 110. The ID is, for example, associated with a corresponding speech profile accessible to the server 110. An example of such ID may be the Unique Identifier ID (UDID), the International Mobile Equipment Identity (IMEI), the Mac-Address, or the Internet Protocol (IP) address of a user network device associated with the user. For example, the user network device 120 sends the ID within the request sent to the server 110. Using automatic identification of the user removes the burden of registration on users, therefore making the speech-enabled service more attractive to consumers.

The use of a device ID as an identifier of the corresponding user allows the automation of the user identification process. However, the use of a device ID as an identification of a particular user raises some challenges in the user identification process. For example, the user may change his user network device. The user may also be using a plurality of user network devices, e.g., a smart phone, tablet, and laptop computer, during a certain period of time. As the user switches from one device to another, the respective device ID changes, and, as such, the new device ID may not be known to the server 110. Users may be reluctant to go through a registration process, in which their e-mail or other personal information is shared, each time they switch to another device. In the following, example embodiments of automatic identification of users are described.

Users may be willing to share some personal information for the purpose of user identification when using the speech-enabled service provided by the server 110. For example, users may allow the server 110 to access personal data 125, such as contact lists and music playlist names, for identification purposes. While IDs such as the UDID, IMEI, Mac-address, and IP address are changed when a particular user 118 switches to a new device, his personal data 125, or meta-data content, generally does not change significantly because users usually synchronize their personal data across different devices and when they switch from one device to another. The personal data 125 from the user network device 120 is then used to link a new device ID to a device ID, associated with the user 118, known to the server 110. The process of using personal data 125 stored in the user network device 120 may be formed automatically with no input from the user 118. The server 110 has access to copies of personal data 131 of users it serves. The copies of personal data 131 are, for example, stored in the database 130. The SPI module 115 is configured to compare the personal data 125 received from the user network device 120 to copies of personal data 131 associated with different users in order to identify the user 118 of the user network device 120. A respective device ID may be associated with each of the copies of the personal data 131.

The personal data 125 includes, for example, at least one list of contacts, at least one list of music files or songs stored in the user network device, at least one list of applications downloaded or installed in the user network device, or the like. Other personal information that may be used to identify the user, either alone or with other personal data, include geo-location data. For example, global positioning system (GPS) data indicative of geo-location patterns of the user network device 120 may be used to identify a user. Geo-location patterns may indicate, for example, frequent positioning at locations associated with the home address, work address, or any location frequently visited by the user. Geo-location data may be used, with other personal data, to increase confidence of the user identification process. Alternatively, data indicative of geo-location patterns may be used alone to identify the user or to link the new device ID to a device ID known to the server 110. The personal data 125 may include recorded voice data of the user 118. In this case, the SPI module 115 extracts acoustic features useful for speaker identification from the received recorded speech. These features may include features like MFCC used for speech recognition or other features, such as voice cepstrum or prosodic features. These features may be used alone or in conjunction with other non-speech features, e.g., contact-list, etc., to identify the user and link the new device ID to a device ID known to the server 110.

Figure 2:
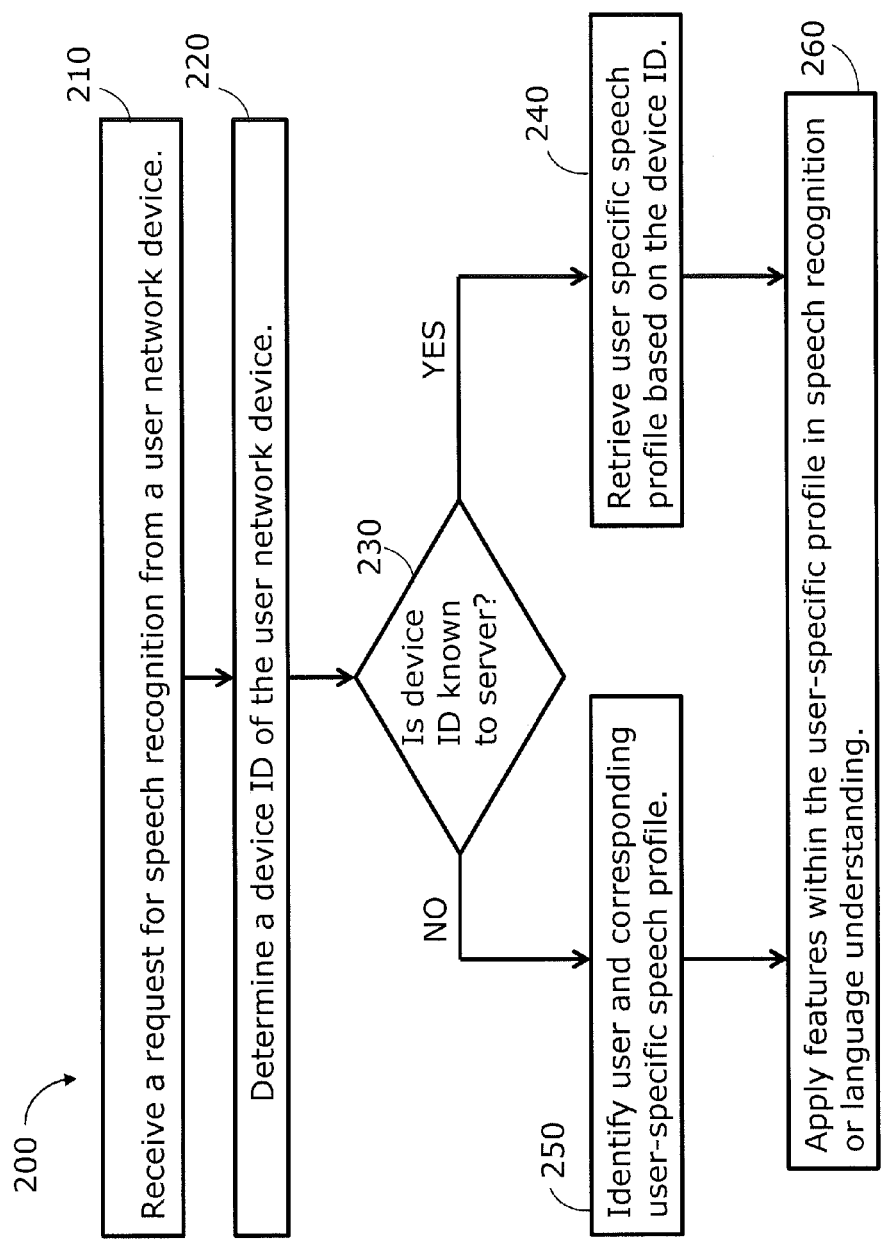
FIG. 2 is a flow chart illustrating a method of determining a speech profile for use in speech recognition or language understanding.

FIG. 2 shows a flowchart illustrating a method 200 according to at least one example embodiment. At block 210, the server 110 receives a request for speech recognition or language understanding from a user network device 120. The request may be in the form of a call made by the user 118 of the user network device 120 with an automatic agent associated with the server 110. The request may, alternatively, be in the form of a recorded speech sent to the server 110 for processing. At block 220, a device ID, associated with the user network device 120 is determined. The device ID may be included in the request or separately requested by the server 110 from the user network device 120. At block 230, the server 110 compares the device ID received from the user network device 120 against device IDs accessible to the serer 110. If a match is achieved, the server 110 uses the matched device ID to retrieve, at block 240, a user-specific speech profile associated with the user 118 of the user network device 120. The speech profile includes at least one of user-specific acoustic feature(s) and user-specific linguistic feature(s) associated with the user 118. If no match is found at block 230, the server 110 identifies, at block 250, the user 118 and the corresponding speech profile, based on personal data received from the user network device 120. At block 260, features within the user-specific speech profile are used in recognizing or understanding the speech from the user 118.

Figure 3:
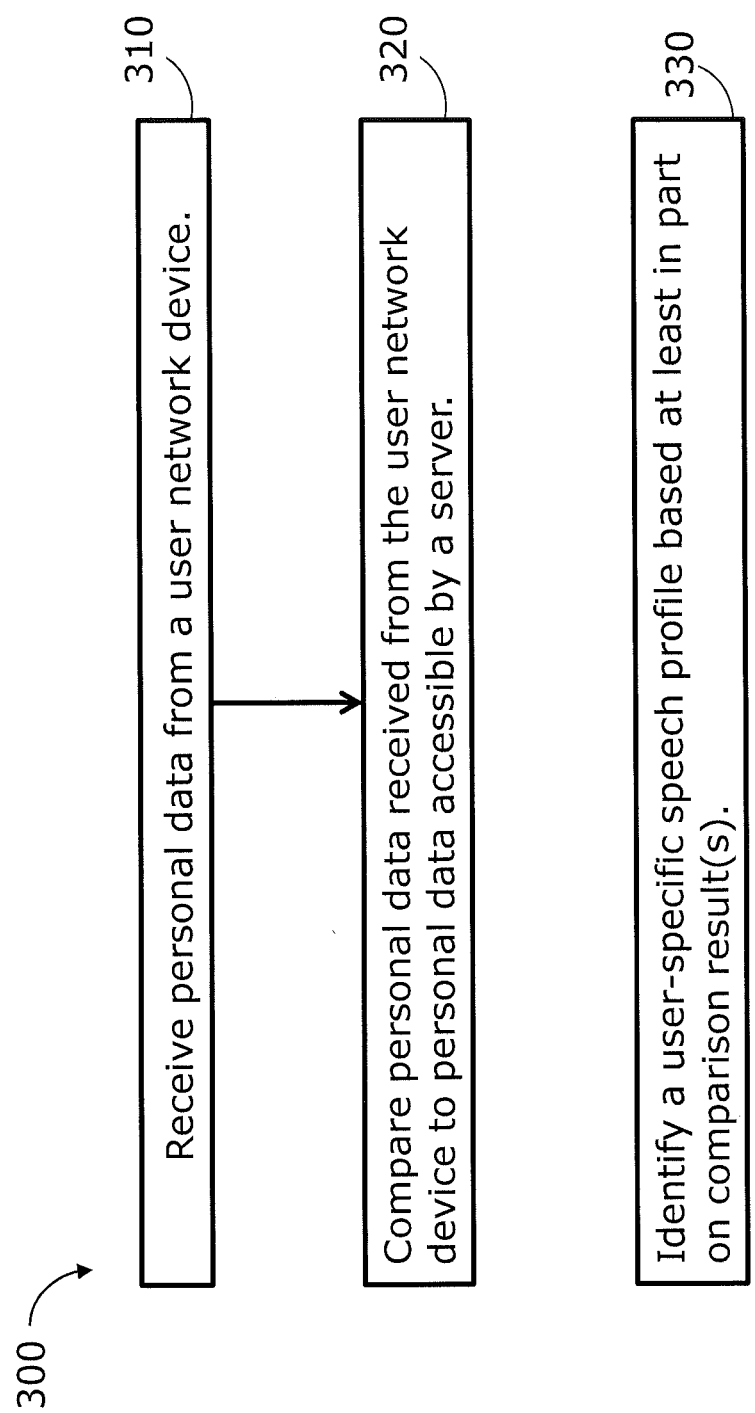
FIG. 3 is a flow chart illustrating a method of identifying a speech profile based on personal information received from a user network device.

FIG. 3 shows a flowchart illustrating a method 300 of identifying a user according to at least one example embodiment. The method 300 may be employed when a device ID received from a user network device does not match any device IDs accessible to the server 110, as shown in block 250 of FIG. 2. Alternatively, the server 110 may employ the method 300 to identify the user without checking the device ID of the respective user network device. Specifically, the method 300 may be applied without checking whether a device ID is recognized by the server 110. At block 310, meta-data or personal data is received from the user network device 120. The meta-data or personal data may be any type of data that distinguishes, at least partially, the user 118 of the user network device 120 from other users. Such data includes, for example, contact list(s), a list of music files' names, a list of multimedia files names, a list of applications installed on the user network device 120, a list of games installed on the user network device, or the like. At block 320, the server 110 compares the meta-data or personal data received from the user network device 120 to meta-data or personal data, accessible by the server 110 and associated with a plurality of users. If a match, or close match, e.g., based on a similarity measure, 70% or more of the same contacts, 80% of the same recent/missed call logs, or the like, is found within one of the meta-data or personal data accessible to the server 110, a user associated with the matched meta-data or personal data is determined as the user of the user network device 120. For example, a user may be determined based on a device ID associated with the matched meta-data or personal data. The server 110 then retrieves, at block 330, a user-specific speech profile, associated with the determined user. For example, if the user-specific speech profile is mapped with the same device ID, the server uses the device ID to retrieve the user-specific speech profile. The user-specific speech profile is then used to process a speech signal received from the user network device 120. The server 110 may further map the device ID of the user network device 120 to the identified user-specific speech profile. Such mapping makes the device ID of the user network device 120 known to the server 110 in processing future requests. The server 110 may also perform synchronization of the users' personal data 131 with corresponding personal data 125 stored in user network devices.

Identifying a user, or a respective speech profile, based on a list of personal data, e.g., a list of contacts, a list of multimedia files, or the like, poses computational and operational challenges. Given a number M of user IDs, or device IDs, already known to the server 110, each ID is associated with at least one personal data list accessible to the server 110. For a new user ID, or device ID, with a corresponding list of personal data received from the user network device 120, it may be computationally exhaustive to compare each item of the received list to items in the lists accessible by the server 110. Alternatively, each list among the lists of personal data accessible to the server 110 has a hash key associated with it, and one other hash key is generated corresponding to the list of personal data received from the user network device 120. Then, the hash key corresponding to the list of personal data received from the user network device 120 is compared to the hash keys associated with the lists accessible to the server 110. If a match is found, the ID corresponding to the matched list is selected as the user ID, or device ID, to be used to identify the corresponding speech profile of the user making the request. Such approach is computationally efficient. The computational complexity may be of order log(M) (O(log(M))), if a binary search of an ordered list of hashes, for example, is employed in finding a match. If, instead of an ordered list, a table of hashes is used, a match may be achieved in a single search operation with computational complexity of O(1). Employing a single hash key for an entire list assumes that a match is achieved if a list of personal data 125 stored on the user network device 120 is identical to a corresponding list within the users' personal data 131 accessible to the server 110. Such assumption is not practical as users usually keep changing personal data lists stored on their devices, for example, by adding or deleting items in the lists. In typical real cases, a personal data list 125 received from the user network device 120 may not be exactly identical to a corresponding list accessible to the server 110. For example, the respective user may add, delete, or modify few items in the personal data list stored on the user network device since a last synchronization. As such, a hash key generated using the modified list would be different from a hash key generated using the same list prior to the modification(s) made by the user.

Figure 4:
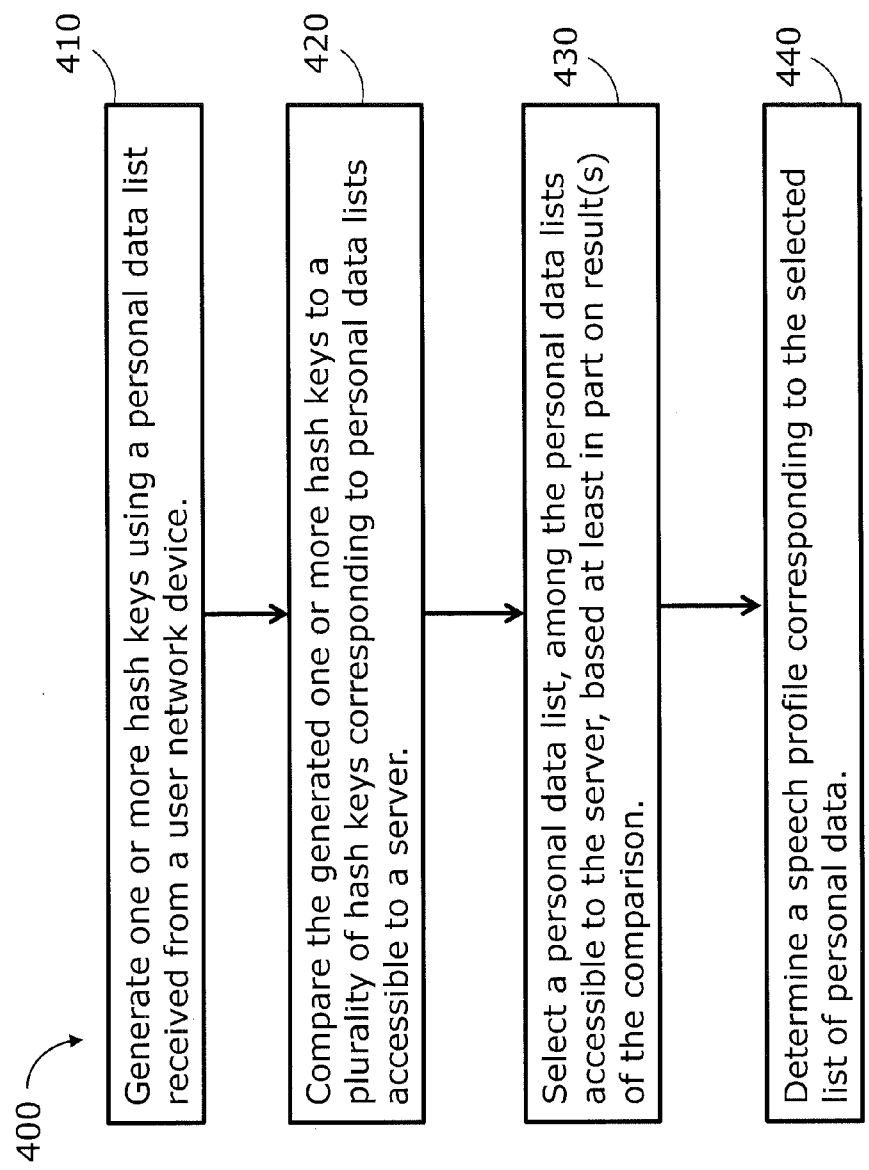
FIG. 4 is a flow chart illustrating an example method of comparing lists of personal data.

FIG. 4 shows a flow chart illustrating a method 400 of comparing lists of personal data, according to at least one example embodiment. The method 400 recognizes that personal data on user network devices may be modified by respective users. The method 400 allows for identifying corresponding lists, within the users' personal data 131, which are not exactly identical to respective lists received from user network devices. At block 410, a plurality of hash keys are generated using a personal data list received from a user network device. For example, the generated hash keys are calculated using different subsets of items, or entries thereof, of the personal data list received from the user network device.

The subsets may be determined according to different ways. For example, if the personal data list is a list of contacts, the hash keys may be generated based on subsets of contacts' names or contacts' phone numbers. Subsets of contacts' names may be determined based an alphabetical classification. For example, entries of names are grouped into different subsets based on the respective first letters. Specifically a subset may include names starting with the same letter. Alternatively, assuming an alphabetical ordering of such names, a subset may include names having the same order, e.g., k-th names, among groups of names starting with the same letter. For example, a first subset may include the first name in the group of names starting with the letter "A" within the list, the first name in the group of names starting with the letter "B," the first name in the group of names starting with the letter "C," . . . , etc. In the case where phone number entries are used, such numbers may be distributed among different subsets based on, for example, respective area codes. According to an example embodiment, the subsets have a fixed size, e.g., fixed number of items in each subset. The subsets may overlap with one-another or may have completely distinct items.

For each subset or chunk of entries or items of the list of personal data 125, a hash key is generated. At block 420, the generated hash keys are compared to a plurality of sets of hash keys, each set corresponds to a list within the users' personal data 131. At block 430, a list within the users' personal data 131 is selected based at least in part on the result(s) of the comparison. According to one example, if a match is achieved for at least a given number of hash keys among all the generated hash keys, the list within the users' personal data 131 with matching hash keys is selected. According to another example, if a match is achieved for at least a given number of hash keys smaller than the total number of generated hash keys but larger than a threshold number, a second comparison of the subsets corresponding to the non-matched hash keys may be performed. In the second comparison, the items, or entries, within the subsets corresponding to the non-matched hash keys may be compared item-by-item to determine, for example, in how many items do the subsets corresponding to the non-matched hash keys differ. For example, the non-matching items within each subset should be less than a threshold number for a match between the subsets to be accepted.

The use of multiple hash keys associated with subsets or chunks of a list of items to be compared to other lists is known as a shingling method. Such approach enables determination of lists that are almost, but not exactly, similar when comparing different lists. In other words, in the case where a user makes changes to a respective personal data list stored on a respective device, the server 110 still can identify the corresponding list within the users' personal data 131 by applying the method 400. As such, the shingling method and similar other methods known in relevant art provide a similarity measure, or measure similarities, between lists or sets of data items.

In addition to the method 400, the server 110 may further use more checking to confirm whether a list within the users' personal data 131 corresponds to a personal data list received from the user network device 120. For example, geo-location data or user recorded voice data may further be used either to pre-filter the lists of users' personal data 131 or to select among matching lists selected at block 430.

At block 440, a user-specific speech profile corresponding to an identified list among the lists within the users' personal data 131 is determined. Determining the user-specific speech profile may be through an ID that is associated with the identified list and mapped to the identified user-specific speech profile. Alternatively, each list within the users' personal data 131 may be linked to a corresponding user-specific speech profile.

It should be understood that the example embodiments described above may be implemented in many different ways. In some instances, the various methods and machines described herein may each be implemented by a physical, virtual or hybrid general purpose or application specific computer having a central processor, memory, disk or other mass storage, communication interface(s), input/output (I/O) device(s), and other peripherals. The general purpose or application specific computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., that enables the transfer of information between the elements. One or more central processor units are attached to the system bus and provide for the execution of computer instructions. Also attached to the system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a computer readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device. For example, a non-transient machine-readable medium may include read only memory (ROM); random access memory (RAM); magnetic disk storage media; optical storage media; flash memory devices; and others.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computerized method for identifying a user, the method comprising:
responsive to a speech recognition request received at a server from a user network device:
comparing, by the server, a hash representation of non-voice personal information data retrieved from a memory of the user network device, the personal information data being separate from data identifying the user network device, against a known hash representation of non-voice personal information, the known hash representation accessible by the server;

identifying, at the server, a speech profile having an acoustic profile specific to the user and linguistic features specific to the user, the identifying being based on the results of comparing the hash representation of non-voice personal information data retrieved from the memory of the user network device against the known hash representation of the non-voice personal information accessible by the server; and processing the speech recognition request, at the server, by applying features of the identified speech profile specific to the user in a speech enabled application;

wherein the received non-voice personal information data includes at least one of the following:

a list of contacts;

information associated with one or more applications;

information associated with one or more music files; and information associated with one or more multimedia files.

2. A method according to claim 1, wherein the user network device is a first user network device and wherein the non-voice personal information accessible by the server is associated with a second user network device different from the first user network device.

3. A method according to claim 1 further comprising retrieving the hash representation of the non-voice personal information data from the user network device.

4. A method according to claim 1 further comprising mapping a device ID of the user network device to the identified speech profile.

5. A method according to claim 1, wherein comparing the hash representation of the non-voice personal information data received from the user network device against the known hash representation of the non-voice personal information accessible by the server includes comparing a list of non-voice personal information data received from the first user network device against a list of non-voice personal information accessible by the server using a shingling method.

6. A method according to claim 1, wherein comparing the hash representation of the non-voice personal information data received from the user network device against the known hash representation of the non-voice personal information accessible by the server includes comparing voice recording data received from user network device with voice recording data accessible by the server.

7. A method according to claim 6, wherein comparing voice recording data received from the user network device with voice recording data accessible by the server includes:

extracting parameters from voice recording data received from the user network device; and comparing the extracted parameters to parameters associated with the voice recording data accessible by the server.

8. A computer server for identifying a user, the server comprising:

a communications interface configured to facilitate communication with a user network device through a communications network;

a memory with computer code instructions stored thereon; and a processor;

the memory with the computer code instructions and the processor being configured to cause the server to:

responsive to a speech recognition request received at the server from the user network device:

compare non-voice a hash representation of personal information data retrieved from a memory of the user network device, the personal information data being separate from data identifying the user network device, against a known hash representation of non-voice personal information, the known hash representation accessible by the server;

identify a speech profile having an acoustic profile specific to the user and linguistic features specific to the user, the identifying based on the results of comparing the hash representation of non-voice personal information data received from the memory of the user network device against the known hash representation of the non-voice personal information accessible by the server; and process the speech recognition request, at the server, by applying features of the identified speech profile specific to the user in a speech enabled applications;

wherein the received non-voice personal information data includes at least one of the following:

a list of contacts;

information associated with one or more applications;

information associated with one or more music files; and information associated with one or more multimedia files.

9. A computer server according to claim 8, wherein the user network device is a first user network device and wherein the non-voice personal information accessible by the server is associated with a second user network device different from the first user network device.

10. A computer server according to claim 8, wherein the first user network device and the second user network device being associated with the user.

11. A computer server according to claim 8, wherein the memory, with the computer code instructions, and the processor are further configured to cause the computer server to retrieve the hash representation of the non-voice personal information data from the user network device.

12. A computer server according to claim 8, wherein the memory, with the computer code instructions, and the processor are further configured to cause the computer server to map a device ID of the user network device to the identified speech profile.

13. A computer server according to claim 8, wherein, in comparing the hash representation of the non-voice personal information data received from the first user network device against the known hash representation of the non-voice personal information accessible by the server, the memory, with the computer code instructions, and the processor are configured to cause the computer server to compare a list of non-voice personal information data received from the user network device against a list of non-voice personal information accessible by the server using a shingling method.

14. A computer server according to claim 8, wherein in comparing the hash representation of the non-voice personal information data retrieved from the first user network device against the known hash representation of the non-voice personal information accessible by the server, the memory, with the computer code instructions, and the processor being further configured to cause the computer server to compare voice recording data retrieved from first user network device with voice recording data accessible by the server.

15. A computer server according to claim 8, wherein, in comparing voice recording data received from user network device with voice recording data accessible by the server, the memory, with the computer code instructions, and the processor are further configured to cause the computer server to:
- extract parameters from voice recording data received from user network device; and
- compare the extracted parameters to parameters associated with the voice recording data accessible by the server.

16. A non-transitory computer-readable medium with computer code instructions stored thereon, the computer code instructions when executed by a processor cause an apparatus to perform the following:
- responsive to a speech recognition request received at a server from a user network device:
- comparing a hash representation of non-voice personal information data retrieved from a memory of the user network device, the personal information data being separate from data identifying the user network device, against a known hash representation of non-voice personal information, the known hash representation accessible by the server; and
- identifying a speech profile having an acoustic profile specific to the user and linguistic features specific to the user, the identifying being based on the results of comparing the hash representation of non-voice personal information data retrieved from the memory of the user network device against the known hash representation of the non-voice personal information accessible by the server;
- processing the speech recognition request, at the server, by applying features of the identified speech profile specific to the user in a speech enabled applications;
- wherein the received non-voice personal information data includes at least one of the following:
- a list of contacts;
- information associated with one or more applications;
- information associated with one or more music files; and
- information associated with one or more multimedia files.

* * * * *